US012808705B2

(12) United States Patent
Schweizer

(10) Patent No.: US 12,808,705 B2
(45) Date of Patent: Nov. 24, 2026

(54) DIFFERENTIAL DOSING SCALE FOR LIQUIDS, AND METHOD FOR DOSING LIQUIDS

(71) Applicant: Schenck Process Europe GmbH, Darmstadt (DE)

(72) Inventor: Peter Schweizer, Darmstadt (DE)

(73) Assignee: Qlar Europe GmbH, Darmstadt (DE)

( * ) Notice: Subject to any disclaimer, the term of this patent is extended or adjusted under 35 U.S.C. 154(b) by 320 days.

(21) Appl. No.: 18/624,030

(22) Filed: Apr. 1, 2024

(65) Prior Publication Data

US 2024/0263990 A1 Aug. 8, 2024

Related U.S. Application Data

(63) Continuation of application No. PCT/EP2022/077246, filed on Sep. 30, 2022.

(30) Foreign Application Priority Data

Oct. 1, 2021 (DE) ..................... 10 2021 125 502.3

(51) Int. Cl.
*G01G 11/08* (2006.01)
*G01G 11/00* (2006.01)
*G01G 17/06* (2006.01)

(52) U.S. Cl.
CPC ........... *G01G 11/08* (2013.01); *G01G 11/003* (2013.01); *G01G 17/06* (2013.01)

(58) Field of Classification Search
CPC ...... G01G 11/08; G01G 11/003; G01G 17/06; G01G 11/086; G01G 17/04; G01G 11/00
See application file for complete search history.

(56) References Cited

U.S. PATENT DOCUMENTS 7,263,899 B2 * 9/2007 Luehrs ................. A01K 5/0275 73/861.355
8,185,234 B2 * 5/2012 Tietjen .................. G01M 1/125 702/175

FOREIGN PATENT DOCUMENTS

DE 19808307 A1 * 9/1999 ............. G01G 13/04
EP 0772028 B1 * 3/2004 ............. G01G 11/04
EP 3258218 B1 * 1/2019 ........... B66B 1/3492

(Continued)

OTHER PUBLICATIONS

International Search Report dated Feb. 22, 2023 in corresponding application PCT/EP2022/077246.

*Primary Examiner* — Laura Martin Sweeney
*Assistant Examiner* — Julia Fitzpatrick
(74) *Attorney, Agent, or Firm* — Muncy, Geissler, Olds & Lowe, P.C.

(57) ABSTRACT

A differential dosing scale and method for dosing liquid. An immersion container in which the liquid to be dosed is contained and/or can be received and/or out of which the liquid to be dosed can be discharged for the dosed removal of the liquid. An immersion tube is immersed into the immersion container for the dosed removal of the liquid to be dosed from the immersion container. A dosing via which the liquid to be dosed can be suctioned out of the immersion container via the immersion tube and can be discharged from the differential dosing scale. The differential dosing scale being designed structurally and/or in terms of control technology to maintain, in the immersion container, a liquid level of the liquid to be dosed at a constant predefined and/or predefinable level relative to the immersion tube.

26 Claims, 3 Drawing Sheets

(56) References Cited

FOREIGN PATENT DOCUMENTS

| | | | | | |
|---|---|---|---|---|---|
| EP | 4049949 | B1 | * | 11/2023 | ............... B07C 5/36 |
| NL | 1040067 | C2 | * | 8/2014 | ............. A01K 5/002 |
| WO | WO-2013026574 | A1 | * | 2/2013 | ........... G01G 11/086 |
| WO | WO2015158764 | A1 | | 10/2015 | |

* cited by examiner

DIFFERENTIAL DOSING SCALE FOR LIQUIDS, AND METHOD FOR DOSING LIQUIDS

This nonprovisional application is a continuation of International Application No. PCT/EP2022/077246, which was filed on Sep. 30, 2022, and which claims priority to German Patent Application No. 10 2021 125 502.3, which was filed in Germany on Oct. 1, 2021, and which are both herein incorporated by reference.

BACKGROUND OF THE INVENTION

Field of the Invention

The present invention relates to a differential dosing scale for dosing fluid, including an immersion container, in which the fluid to be dosed is contained and/or may be received, and/or from which the fluid to be dosed may be discharged for the dosed removal of the fluid, an immersion tube, which dips into the immersion container for the dosed removal of the fluid to be dosed from the immersion container, and a dosing pump, with the aid of which the fluid to be dosed may be sucked out of the immersion container via the immersion tube and may be discharged from the differential dosing scale. The present invention also relates to a method for dosing fluid.

Description of the Background Art

Differential dosing scales of this type for dosing fluid are already known from the prior art. For example, WO 2015/158764 A1 discloses a differential dosing scale for dosing fluid, including a hopper-shaped container for the fluid to be dosed, including a dosing pump, including a line connected to the dosing pump for removing the fluid from the container, including a weighing cell connected to the container for determining the weight of the container, and including a regulating device, the container-side end of the line being guided into the container from above and arranged at a distance from the container.

However, known differential dosing scales, which are based on the principle of the immersion tube-based removal of fluid from a weighed container, have the disadvantage that the immersion tube dipping into the weighed container has a buoyancy force, which corrupts the weighing result. This buoyancy force-induced error is dependent on the density of the fluid as well as the volume displaced by the immersion tube. Since the volume displaced by the immersion tube changes along with the immersion depth of the immersion tube, and the immersion depth of the immersion tube, in turn, is dependent on the changing fill level of the weighed container due to the fluid removal, the buoyancy force-induced error behaves in a manner proportional to the fill level in the case of a constant, for example cylindrical, container cross-section, variably over time in the case of a steadily changing, for example conical, container cross-section, and abruptly in the case of an unsteadily changing container cross-section, for example one having built-in components such as probes or heating elements. In particular, in the case of differential dosing scales of this type having regulated weight loss, the described effects are undesirable and must be computationally corrected, for which purpose knowledge of the precise fill level changing over time as well as of the fill level-dependent container cross-section is necessary. A further disadvantage of known differential dosing scales of this type is that the immersion tube must be positioned deep enough in the immersion container that the continued suction of the fluid is ensured even as the fill level drops. However, as the immersion depth increases, so does the suction lift of the dosing pump, so that the selection of dosing pumps, deliverable fluids, or the maximum container height is limited. In addition, the pressure ratios on the suction side of the dosing pump change along with the changing fill level, which, in turn, results in a shifting of the working point on the pump characteristic curve and thus in a deterioration of the controllability of the controlled system.

SUMMARY OF THE INVENTION

It is therefore an object of the present invention to avoid or at least to mitigate the disadvantages of the prior art. In particular, a differential dosing scale is to be provided, which has a good decoupling of the weighing technology and whose weighing result may be ascertained easily and precisely.

In the case of a generic differential dosing scale, the object of the invention is achieved according to the invention in that the differential dosing scale is designed structurally and/or in terms of control technology in such a way that a fluid height of the fluid to be dosed, present in the immersion container, is kept at a constant predetermined and/or predeterminable height relative to the immersion tube.

The invention is based on the surprising finding that the weighing result may be improved by keeping the immersion depth of the immersion tube practically constant in the fluid to be dosed in the immersion container. This is achieved according to the invention in that the fluid level in the immersion container is kept constant relative to the immersion tube. The immersion depth of the immersion tube may be particularly easily and yet reliably set thereby and maintained at least temporarily.

The immersion container (and optionally a storage container described in detail below) and the fluid contained therein preferably form a closed, for example, fixedly interconnected system (weighed system), whose weight is detected to be able to ascertain the fluid loss from the immersion container from the decreasing weight of the weighed system. The immersion tube preferably dips into the immersion container/beneath the fluid level, so that the fluid to be removed via the immersion tube may be sucked with the aid of the dosing pump connected to the immersion tube and supplied in a dosed manner to a downstream process. The immersion tube is preferably arranged at a distance from the container wall of the immersion container and preferably dips into the immersion container from above, so that the immersion tube is not supported on the immersion container, and no force fit (force shunt) is present between the immersion tube and the immersion container or the weighed system. This means that the immersion tube and the dosing pump are preferably not part of the weighed system, and their weight is not detected. According to the invention, the differential dosing scale may have structural and/or regulation measures which are designed to keep the surface of a fluid quantity present in the immersion container at the constant height relative to the immersion tube in the immersion container, regardless of the fluid removal/delivery rate of the dosing pump. This means that the differential dosing scale is preferably designed in such a way that the position of the fluid level relative to the immersion container does not change even if fluid is discharged/sucked out of the immersion container via the immersion tube, or that a change in the fluid fill level is compensated for by the structural and/or regulation measures.

This has the advantage that the disadvantages associated with a changing immersion depth may be avoided by keeping the height constant relative to the immersion tube. Although the buoyancy force itself is independent of the container geometry, since it depends exclusively on the quantity of the displaced volume, the container geometry does play a role in changes in the immersion depth over time, since the fluid level changes depending on time with a constant removal quantity. Every time-dependent change in force (buoyancy force in this case) is included in the ascertained delivery rate in the case of the differential dosing scale. In the present invention, therefore, it is no longer necessary to know the container geometry to be able to calculate the change in buoyancy force therefrom, since the buoyancy force remains unchanged or practically unchanged due to the constant immersion depth of the immersion tube. Due to the constant immersion depth, not only the buoyancy force of the immersion tube remains constant during the operation of the differential dosing scale, but the working point of the dosing pump may also advantageously remain constant throughout, so that the system has a good controllability. In addition, a shallower immersion depth for the immersion tube may be selected, due to the constant immersion depth, which, in turn, either reduces the buoyancy force of the immersion container and the error resulting therefrom to a possibly acceptable amount or minimizes the effort required for its computational compensation. The weighing system may be adjusted according to known methods with the aid of test weights and a filled fluid.

Above all, a varying buoyancy force acting upon the immersion tube during the dosing may also be reliably avoided or at least significantly reduced.

During the operation of the differential dosing scale, the immersion tube is preferably at least partially immersed in the fluid contained in the immersion container.

The height of the fluid level is preferably plotted along the world coordinate system and/or along an axis in parallel or antiparallel to the direction of gravitational force.

The fluid level is preferably kept constant during the operation of the differential dosing scale and/or during the dosing of the fluid.

Within the meaning of the present application, keeping the height of the fluid level constant relative to the immersion tube preferably means that the perpendicular distance between the immersion tube (or a reference point of the immersion tube) and the fluid level is kept constant.

The immersion tube can be stationary. The immersion tube is preferably arranged along an axis in parallel to the direction of gravitational force.

The fluid level of the fluid to be dosed, present in the immersion tube, may be kept at a constant predetermined and/or predeterminable level relative to an intake opening of the immersion tube. The opening may be in parallel or perpendicular to the fluid level, for example within a plane.

Keeping the height of the fluid level constant relative to the immersion tube can mean, in this respect, that the perpendicular distance between the plane, within which the intake opening is situated, and the plane of the fluid level is kept constant.

The immersion container may be displaceable along at least one path of movement, preferably running along a direction in parallel to the normal vector of the fluid level and/or to the direction of gravitational force. In that the immersion container is displaceable, a fluid level relative to the immersion container dropping within the immersion container during the removal of fluid may continue to be held in position in that the immersion container is displaced.

The immersion container may preferably be pushed back and forth along the path of movement.

The immersion tube may be displaceable along at least one path of movement, preferably running along a direction in parallel to the normal vector of the fluid level and/or to the direction of gravitational force. In that the immersion tube is displaceable, a fluid level relative to the immersion tube dropping within the immersion container during the removal of fluid may be held in position in that the immersion tube is displaced.

The immersion tube may preferably be pushed back and forth along the path of movement.

The dosing pump may be displaceable along at least one path of movement, preferably running along a direction in parallel to the normal vector of the fluid level and/or to the direction of gravitational force, and the differential dosing scale may preferably be designed in such a way that the dosing pump is displaced in the same direction and/or at the same time as the immersion tube, and/or is kept at a constant predetermined and/or predeterminable height relative to the immersion tube and/or the fluid level. The relative distance between the dosing pump and the suction lift (for example, at the intake opening of the immersion tube facing the fluid during the dosing and/or arranged within the fluid) may be kept constant thereby, and the dosing pump operated in a defined or definable working point.

This is advantageous since the characteristic curve of a dosing pump is typically dependent on the difference in height between the position of the pump itself and the suction position.

A displacement of the dosing pump and immersion tube "in the same direction" means that, while the dosing pump is being displaced in one direction, a displacement of the immersion tube takes place in the same direction (and vice versa). If the direction of the displacement of the dosing pump changes, the direction of the displacement of the immersion tube also changes.

The differential dosing scale may have a detection device for detecting a position of the fluid level and/or for detecting a fill level height of the fluid in the immersion container, the detection device including, in particular, an optical sensor, an ultrasonic sensor, and/or a microwave sensor. In this way, the position of the fluid level (in particular along a direction in parallel or antiparallel to the direction of gravitational force) may be particularly advantageously and precisely determined. The position of the fluid level is preferably determined in the world coordinate system (z direction) and/or relative to a reference, such as the intake opening of the immersion tube.

Based on the position of the fluid level, the fill level height of the fluid in the immersion container may be ascertainable if the position and shape of the immersion container is known. Other possibilities for determining the fill level height of the fluid in the immersion container are also known to those skilled in the art.

The detection device preferably works in a contactless manner, i.e., in particular, without contact with the fluid and/or the immersion container.

The differential dosing scale may be designed to displace the immersion container, the immersion tube, and/or the dosing pump depending on a position of the fluid level and/or a fill level height of the fluid in the immersion container, the position and/or fill level height preferably being ascertained with the aid of the detection device. In this way, a regulation of the immersion depth of the immersion tube in the fluid to be dosed may be particularly advantageously implemented.

As a result, the buoyancy force acting upon the immersion tube does not change or only to a limited extent despite the removal of fluid. The same correspondingly applies the other way round when supplying fluid (for example, when filling the immersion container).

The displacement of the immersion container, immersion tube, and/or dosing pump preferably takes place along the particular path of movement in each case.

The constant height is advantageously maintained at least temporarily during the operation of the scale and/or during the dosing of the fluid.

The immersion container can be displaced accordingly.

The immersion tube can be displaced accordingly.

The immersion container and the immersion tube can be displaced accordingly.

The immersion tube and the dosing pump can be displaced accordingly.

The immersion container, the immersion tube, and the dosing pump can be displaced accordingly.

If the immersion container can (also) be displaced, one or multiple of the following options is/are particularly advantageous:

In the case of a net fluid removal from the immersion container (i.e., if more fluid flows out of the immersion container than enters it), the immersion container is preferably displaced in parallel to the normal vector of the fluid level and/or antiparallel to the direction of gravitational force, in particular in the case of a stationary immersion tube.

In the case of a net fluid supply to the immersion container (i.e., if more fluid enters the immersion container than flows out of it), the immersion container is preferably displaced antiparallel to the normal vector of the fluid level and/or in parallel to the direction of gravitational force, in particular in the case of a stationary immersion tube.

If the immersion tube is (also) displaced, one or multiple of the following options is/are particularly advantageous:

In the case of a net fluid removal from the immersion container (i.e., if more fluid flows out of the immersion container than enters it), the immersion tube is preferably displaced antiparallel to the normal vector of the fluid level and/or in parallel to the direction of gravitational force.

In the case of a net fluid supply to the immersion container (i.e., if more fluid enters the immersion container than flows out of it), the immersion tube is preferably displaced in parallel to the normal vector of the fluid level and/or antiparallel to the direction of gravitational force.

In each case, a changing, in particular dropping or rising, fluid level relative to the immersion tube resulting from a change, in particular a decrease or increase, in the fluid quantity in the immersion container, may be reliably kept to a constant height thereby.

The differential dosing scale may be designed so that the immersion container and/or the immersion tube is/are displaced, in particular to maintain the constant height of the fluid level relative to the immersion tube.

The options discussed above also apply here correspondingly, individually or in any combination. Above all, the constant height may also be advantageously maintained at least temporarily during the operation of the scale and/or during the dosing of the fluid.

The differential dosing scale may be designed so that the immersion container and the immersion tube are both displaced at least temporarily simultaneously and/or in opposite directions, in particular to maintain the constant height of the fluid level relative to the immersion tube. A constant immersion dept of the immersion tube in the fluid to be dosed may be reliably achieved thereby even with great changes in the fluid level, since the changing fill height of the immersion container may be simultaneously compensated for by two displacement paths. As a result, the individual displacement paths of the immersion tube and immersion container may also each be shorter, and the immersion container may be provided with a more compact design.

The simultaneous displacement of the immersion container and the immersion tube can be carried out only at least temporarily during a period of filling the immersion container and, in particular, only the immersion container or only the immersion tube is displaced during the dosing of the fluid.

At least the immersion container may belong to a weighed system of the differential dosing scale.

A differential dosing scale of this type, which is based on the principle of immersion tube-based fluid removal from a weighed container, the immersion container in this case, compared to weighing systems which use a flexible decoupling element, is characterized in that it has a good force decoupling between the weight part of the differential dosing scale (in this case, at least the immersion container and/or a possible storage container, which is discussed in detail below) and the non-weighed part of the differential dosing scale (in this case, at least the immersion tube and the dosing pump).

For example, the fluid in the immersion container can also belong to the part of the weighed system of the differential dosing scale.

The differential dosing scale may be designed to carry out the speed and/or the direction of the displacement of the differential dosing scale, the immersion tube, and/or the dosing pump, in each case depending on a change in the position of the fluid level and/or the fill level height of the fluid in the immersion container and/or depending on a change in the results of weighings of the weighed system. The height of the fluid level may be particularly reliably set thereby in terms of control technology. In particular, an inflow of fluid, for example from the storage container, may also be included, and the constant height relative to the immersion tube may also be maintained throughout.

For example, the change in the position may be a rate of change of the height. This may be ascertained, for example, based on the detection results. It is thus also possible to react to different speeds at which the fluid level moves (in particular during the dosing and/or during the filling of the immersion container).

The speed and/or the direction of the displacement of the immersion container may be carried out accordingly.

The speed and/or the direction of the displacement of the immersion tube may be carried out accordingly.

The speed and/or the direction of the displacement of the immersion container and the immersion tube in each case may be carried out accordingly.

The speed and/or the direction of the displacement of the immersion tube and the dosing pump in each case may be carried out accordingly.

The speed and/or the direction of the displacement of the immersion container, the immersion tube, and the dosing pump in each case may be carried out accordingly.

A changing, in particular dropping or rising, fluid level relative to the immersion tube resulting from a change, in particular a decrease or increase, in the fluid quantity in the immersion container, may be reliably kept to a constant level thereby.

The differential dosing scale may include a storage container, in which the fluid to be dosed is contained and/or may be received, the immersion container being fluidically connected to the storage container for supplying the fluid to be dosed from the storage container into the immersion container. Fluid may be supplied to the immersion container thereby, for example, if the fluid in the immersion container drops below a critical fill level height. The fluid is preferably supplied to the immersion container accordingly, for which purpose the differential dosing scale may be correspondingly designed.

For example, the filling of the immersion container may be at least partially carried out after certain time intervals. During the filling, for example, the displacement path of the immersion container and/or the dosing pump may be reversed as in the case of dosing, and/or the adaptable volume described below may be increased during the filling.

In particular, the differential dosing scale is a differential dosing scale including a corresponding storage container.

The storage container may belong to the weighed system of the differential dosing scale. The weighing result is advantageously not changed thereby if fluid from the storage container is redistributed to the immersion container.

The differential dosing scale may be designed structurally and/or in terms of control technology in such a way that a fluid level of the fluid to be dosed, present in the immersion container, is kept to a constant predetermined and/or predeterminable fill level during the operation of the differential dosing scale and/or during the dosing of the fluid.

To compensate for the fluid to be dosed, which was removed from the immersion container, the immersion container may be connected to the storage container via a connecting line and be supplied therefrom.

According to the invention, the differential dosing scale may have structural and/or regulation measures which are designed to keep a fluid quantity present in the immersion container, and thus the fill level of the fluid in the immersion container, at the constant height/determined fill level, regardless of the fluid removal/delivery rate of the dosing pump. This means that the differential dosing scale is preferably designed in such a way that its fluid fill level in the immersion container does not change even if fluid is discharged/sucked out of the immersion container via the immersion tube, or that a change in the fluid fill level is compensated for by the structural and/or regulation measures.

This has the advantage that the disadvantages associated with a changing fill level may be avoided by keeping the immersion container fill level constant. In particular, it is no longer necessary to know the container geometry to be able to calculate the change in buoyancy force therefrom, since the buoyancy force remains unchanged due to the constant immersion depth of the immersion tube. Due to the constant fill level, not only the buoyancy force of the immersion tube remains constant during operation, but the working point of the dosing pump may also advantageously remain constant, so that the system has a good controllability. In addition, a shallower immersion depth for the immersion tube may be selected, due to the constant fill level, which, in turn, either reduces the buoyancy force of the immersion container and the error resulting therefrom to a possibly acceptable amount or minimizes the effort required for its computational compensation. The weighing system may be adjusted according to known methods with the aid of test weights and a filled fluid.

The differential dosing scale may have a float valve arranged in a fluid connection between the storage container and the immersion container and a float body arranged in the immersion container. Since float valves and float bodies of this type are already used in other applications apart from the differential dosing scales, it is possible without a great deal of effort to make such a design change to the differential dosing scale. An integration is easily possible due to the fact that the storage container and the immersion container are already connected via a connecting line/fluid line for the purpose of supplying/feeding fluid to the immersion container.

The float valve may be controlled by the float body in such a way that it opens the fluid connection when dropping below the predetermined fill level and disconnects/closes the fluid connection upon reaching the predetermined fill level. This means that the supply quantity is controlled via the float valve and the float body in the immersion container in such a way that the predetermined fill level in the immersion container is ensured. The fill level in the immersion container is thus kept constant with the aid of a device having a simple technical structure, no additional actuating energy or regulation/control being needed for the mechanically operating float valve. In other words, the float valve limits the minimal fill level to the predetermined fill level.

The immersion container may be arranged below the storage container in the direction of gravitational force, so that the fluid to be dosed may be supplied to the immersion container from the storage container due to the gravitational force. This means that no separate pump is needed to guide the fluid into the immersion container from the (significantly larger) storage container, but instead it is sufficient to open the fluid connection between the storage container and the immersion container.

The fluid connection determined via the float valve in the immersion container may have a gravitational force-induced delivery rate, which is higher than a delivery rate of the dosing pump. This means that, due to the opening of the float valve, at least as much fluid per time may be supplied as is removed from the immersion container via the dosing pump. It is ensured thereby that the inflow quantity corresponds to the outflow quantity, and a delayed compensation of the fill level does not occur.

The volume receivable by the immersion container may be adapted, in particular in that a base region and/or a wall region of the immersion container is designed to be movable and/or variable in shape, at least in regions. In that the quantity of fluid which may potentially be held in the immersion container is changed by changing the holding volume of the immersion container, a fluid level dropping or rising within the immersion container may continue to be held in position relative to the immersion tube. As a result, the buoyancy force acting upon the immersion tube does not change or only to a limited extent despite the net removal or net inflow of fluid.

A movable base and/or wall region may be implemented, for example, by a base and/or wall region which is rotatable around a rotation axis and/or hinged around an axis. A movable base and/or wall region may also be implemented, for example, by a displaceable base and/or wall region, for example, in that the base is adjustable in height and/or a side wall may be moved inward and/or outward.

A base and/or wall region which is variable in shape may greatly reduce the volume in different ways, for example for the duration of a force acting upon the outside of the immersion container, depending on the strength and/or the direction of the influencing force.

A base and/or wall region which is variable in shape may be implemented, for example, by a base and/or wall region which has a reversibly deformable material, at least in regions, for example, a diaphragm-like surface region. For example, a rubber diaphragm or a gas bubble, similar to a diaphragm expansion tank in heating technology, may be used here. By changing the upstream pressure on the gas side of the diaphragm, the fill level may be adjusted to compensate for different fluid densities. Due to the application of force to this surface region from outside the immersion container, the surface region may be pressed inward and the holding volume reduced thereby, and/or the holding volume may be increased by reducing the pressure.

The differential dosing scale may be designed to adapt the volume receivable by the immersion container depending on a position of the fluid level and/or a fill level of the fluid in the immersion container.

In the case of a net fluid removal from the immersion container, the volume is preferably reduced.

In the case of a net fluid inflow into the immersion container, the volume is preferably increased.

Changing, in particular dropping or rising, fluid levels relative to the immersion tube resulting from a change, in particular a decrease or increase, in the fluid quantity in the immersion container, may be reliably kept to a constant height thereby.

The differential dosing scale may include an overflow element fluidically connected to the immersion container. The overflow element may be designed in such a way that the fluid to be dosed flows out of the immersion container via the overflow element upon exceeding the predetermined fill level. The general provision of an overflow element is a known design which prevents the uncontrolled overflow of the immersion container. The overflow element can be designed in such a way that the overflow element ensures that the fill level does not exceed the predetermined fill level. If more fluid is continuously supplied to the immersion container than is removed therefrom, the fill level may thus be kept at the predetermined fill level at any point in time. In other words, the overflow element limits the maximal fill level to the predetermined fill level. In addition, the differential dosing scale is designed in such a way that, at any point in time, at least the same amount of fluid is supplied to the immersion container as flows out of it.

The differential dosing scale may include an overflow container, to which the overflow element is fluidically connected for the purpose of collecting the fluid flowing out over the predetermined fill level. This has the advantage that the overflow fluid is collected and may be resupplied to the immersion container.

In particular, the immersion container may be arranged above the overflow container in the direction of gravitational force. This has the advantage that the fluid flows into the overflow container from the immersion container due to gravitational force without using a pump or the like.

The differential dosing scale may include an overflow pump, with the aid of which the fluid to be dosed may be sucked out of the overflow container and supplied to the immersion container. The overflow fluid may thus be resupplied to the immersion container. Alternatively, the fluid may be sucked out of the overflow container and resupplied to the storage container, from which it is, in turn, supplied to the immersion container. It is crucial that the overflow container is part of the weighed system, and the fluid may be supplied to the immersion container (directly or via the storage container). The overflow pump is thus used to deliver the fluid from the overflow container to a greater height against the gravitational force for the purpose of supplying the fluid to the immersion container.

The overflow pump may preferably have a higher delivery rate than the dosing pump or be operated at a greater delivery rate. This means that the immersion container is continuously supplied with a greater fluid quantity than is removed therefrom, the delta between the inflow and outflow quantities being provided by the overflow.

The overflow container may be formed by the storage container. This means that the storage container is arranged below the immersion container in the direction of gravitational force, and the fluid is supplied to the immersion container via the overflow pump. Only two containers are thus necessary if the storage container is simultaneously used as the overflow container. However, for reasons of installation space, it may be necessary to provide a separate overflow container, so that the storage container is arranged above the immersion container and the overflow container and used for supplying the immersion container, and the overflow container is arranged below the immersion container and used to collect the overflow fluid, and the collected fluid is resupplied either to the immersion container directly or to the storage container.

The differential dosing scale may include a control valve arranged in a fluid connection between the storage container and the immersion container, which is controlled and/or regulated in such a way that it supplies a fluid quantity from the storage container to the immersion container, which corresponds to a fluid quantity removed from the differential dosing scale via the immersion tube. This means that the fill level may also be kept constant by means of regulating measures, in that, at any point in time, exactly the same quantity of fluid is supplied to the immersion container as removed from the immersion container. Due to the fact that the weight of the fluid removal has already been detected, the control/regulation of the control valve may be additionally easily implemented.

The immersion tube may have an intake opening for sucking in the fluid to be dosed from the immersion container. This may be, in particular, the intake opening already described farther above. The immersion tube may preferably be arranged in the immersion container in such a way that the intake opening dips into the fluid below the predetermined fill level at an immersion depth which is between 1 to 10 times the diameter of the immersion tube. This means that the immersion depth should be as shallow as possible to minimize the buoyancy rising as the immersion depth increases and to minimize the increasing suction lift to be overcome as the immersion depth increases in order to keep the resulting error low. A wall thickness of the immersion tube should also be as small as possible to minimize the rising buoyancy as the wall thickness increases and to minimize the resulting error.

The differential dosing scale may include a weighing device, which is designed to detect the weight of a and/or the (fixedly interconnected) system, in particular made up of the storage container, the immersion container, and the fluid to be dosed and contained therein (i.e., without the pump and immersion tube). The quantity of the fluid discharged via the dosing pump may then be gravimetrically ascertained from the weight loss. The delivery quantity may thus be determined particularly precisely.

The differential dosing scale may include a control and/or regulating device, which is designed to control and/or regulate the dosing pump depending on the weight of the system detected by the weighing system and depending on a control variable for a quantity of the fluid to be discharged from the differential dosing scale via the immersion tube. The delivery quantity may be supplied to a downstream process thereby in a particularly precisely dosed manner.

The immersion container and/or the storage container may have a downwardly tapering (i.e., in the direction of gravitational force), for example conical, cross-sectional shape.

The invention also relates to a method for dosing fluid. According to the invention, the method includes the fact that the fluid to be dosed is provided in an immersion container of a differential dosing scale, in particular, according to one of the preceding claims, from which immersion container the fluid to be dosed is sucked, for the dosed removal of the fluid, with the aid of a dosing pump via an immersion tube dipping into the immersion container for the dosed removal of the fluid to be dosed from the immersion container, and discharged from the differential dosing scale. a fluid level of the fluid to be dosed in the immersion container being kept at a constant, predetermined and/or predeterminable height relative to the immersion tube, in particular to an intake opening of the immersion tube, in particular during the operation of the differential dosing scale and/or during the dosing of the fluid.

All advantages and options which have been described above with reference to the differential dosing scale correspondingly apply here individually and in any combination. Reference may therefore be made at this point to the preceding examples and embodiments.

In particular, all features of the differential dosing scale described above may be provided individually and in any combination in the case of the differential dosing scale used in the method. All features, with regard to which the differential dosing scale described above is designed, may also be carried out within the method. Above all, the options which are again pointed out in the following examples and specific embodiments are particularly advantageous and may be provided in the method.

The immersion container and/or the immersion tube may be displaced, in particular, to maintain the constant height of the fluid level relative to the immersion tube.

The immersion container, the immersion tube, and/or the dosing pump may be displaced depending on a position of the fluid level and/or a fill level height of the fluid in the immersion container, the position and/or fill level height preferably being ascertained with the aid of a detection device.

A fluid level of the fluid to be dosed, present in the immersion container, may be kept at a constant predetermined and/or predeterminable fill level during the operation of the differential dosing scale and/or during the dosing of the fluid.

A fluid connection between a storage container containing the fluid to be dosed and the immersion container may be opened, in particular, by actuating a float valve arranged in the fluid connection, upon dropping below the predetermined fill level, and the fluid connection may be disconnected upon reaching the predetermined fill level, the fluid connection preferably being provided for supplying the fluid to be dosed to the immersion container from the storage container.

In summary, the invention relates to a differential dosing scale, in which, in combination, the known decoupling of the weighing technology with the aid of an immersion tube is combined with a device which ensures a shallow, constant immersion depth in the fluid. The disadvantages of a decoupling element are thus avoided (such as a low force shunt, a good chemical, thermal, and pressure resistance, an electrostatic discharge capacity, a low thermal expansion, an easy, reproducible mountability). According to the invention, the disadvantage of the immersion tube is also avoided, that the fluid quantity displaced by the immersion tube generates a weighing error to be computationally compensated for, which is dependent on the media density, the tube geometry, and the container fill level, and the disadvantage of the immersion tube is avoided, that the length of the immersion tube is essentially determined by the container height, and the necessary suction lift of the pump increases at greater container heights, whereby the selection of delivery media/fluids which may be dosed and pump types is limited. This is achieved in that a constant immersion depth of the immersion tube may be maintained in that, for example, the fill level in the immersion container is kept to the predetermined fill level regardless of the quantity of the discharged fluid. A float valve is preferably provided, which keeps the fill level in the immersion container constant. Another preferred approach provides for an immersion container, whose fill level is kept constant by an overflow element. It is necessary to transfer the overflow medium back to a greater height with the aid of an overflow pump to be able to resupply it to the immersion container. The invention also relates to a method for dosing fluid.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
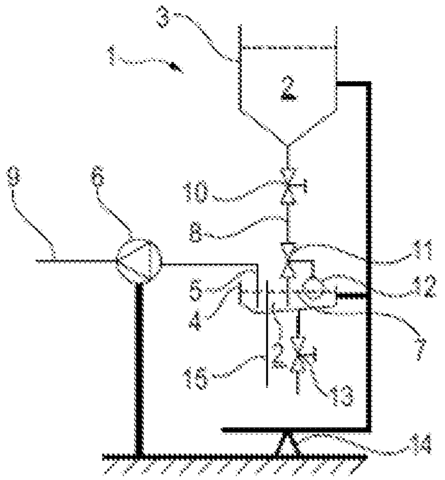
FIG. 1 shows a schematic representation of an example of a differential dosing scale according to the invention.
Figure 2:
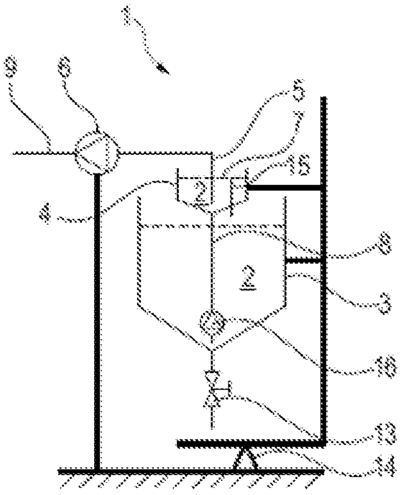
FIG. 2 shows a schematic representation of an example of the differential dosing scale according to the invention.
Figure 3:
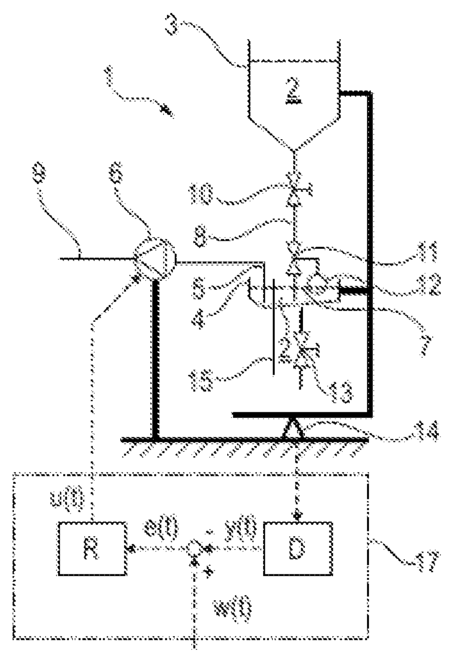
FIG. 3 shows a schematic representation of the example of the differential dosing scale, including a regulating device.

FIGS. 1 through 3 show schematic views of a differential dosing scale 1 according to the invention. Differential dosing scale 1 is used for dosing fluid 2. Differential dosing scale 1 includes a storage container 3, in which fluid 2 to be dosed is contained, and an immersion container 4, which is fluidically connected to storage container 3 for supplying fluid 2 to be dosed to immersion container 4 from storage container 3, and from which fluid 2 to be dosed may be discharged for the dosed removal of fluid 2. Differential dosing scale 1 also includes an immersion tube 5, which dips into immersion container 4 for the dosed removal of fluid 2 to be dosed from immersion container 4. Immersion tube 5 dips into immersion container 4 in such a way that no force shunt arises, and the immersion tube is not supported via immersion container 4. In particular, immersion tube 5 is arranged at a distance from a container wall of immersion container 4. Differential dosing scale 1 furthermore includes a dosing pump 6, with the aid of which fluid 2 to be dosed may be sucked out of immersion container 4 via immersion tube 5 and may be discharged from differential dosing scale 1 (for a downstream process).

According to the invention, differential dosing scale 1 is designed structurally and/or in terms of control technology in such a way that a fluid level of fluid 2 to be dosed, present in immersion container 4, is kept at a constant predetermined fill level 7 (i.e., in particular, the height of the fluid level relative to the preferably stationary immersion tube is kept constant).

In the illustrated examples, storage container 3 is connected to immersion container 4 via a connecting line/fluid line 8, and immersion tube 5 or dosing pump 6 is connected to the downstream process via a discharge line 9. Storage container 3, immersion container 4, and connecting line 8 are part of a weighed system, while immersion tube 5, dosing pump 6, and discharge line 9 are not part of the weighed system but are supported separately. In addition, a maintenance valve 10 may be arranged in connecting line 8, via which a fluid connection between storage container 3 and immersion container 4 may be blocked/disconnected for maintenance purposes.

In the example illustrated in FIG. 1, a keeping constant of predetermined fill level 7 is implemented in that a float valve 11 is arranged in connecting line 8, and a float body 12 is arranged in immersion container 4. Float valve 11 is controlled by float body 12 in such a way that it opens the fluid connection upon dropping below predetermined fill level 7 and disconnects the fluid connection upon reaching a predetermined fill level 7.

In the example illustrated in FIG. 1, immersion container 4 is arranged below storage container 3 in the direction of gravitational force, so that fluid 2 to be dosed may be supplied to immersion container 4 from storage container 3 due to the gravitational force. The gravitational force-induced delivery rate which may be implemented via float valve 11 in immersion container 4 may preferably be higher than a delivery rate of dosing pump 6 to be able to ensure sufficient refilling.

In addition, immersion container 4 may include an emptying valve 13, through whose opening fluid 2 may be discharged for completely emptying immersion container 4, and/or an overflow element 15, through which fluid 2 may flow out of immersion container 4 if an overflow fill level is exceeded.

Differential dosing scale 1 also includes a weighing device 14, which is designed to detect the weight of the weighed system, i.e., in FIG. 1, that of storage container 3, immersion container 4, connecting line 8, float valve 11, float body 12, emptying valve 13, overflow element 15, and fluid 2 contained in storage container 3, connecting line 8, and immersion container 4. The quantity of fluid 2 discharged via dosing pump 6 may 6 may preferably be gravimetrically ascertained therefrom.

In the example illustrated in FIG. 1, the keeping constant of predetermined fill level 7 is implemented in that differential dosing scale 1 includes overflow element 15 fluidically connected to immersion container 4, which is designed in such a way that fluid 2 to be dosed flows out of immersion container 4 via overflow element 15 upon exceeding predetermined fill level 7. Differential dosing scale 1 also is designed in such a way that, at any point in time, at least the same amount of fluid 2 is supplied to immersion container 4 as flows out of it via overflow element 15.

Differential dosing scale 1 may preferably also include an overflow container, which, in the example illustrated in FIG. 2, is formed by storage container 3, to which overflow element 15 is fluidically connected for collecting fluid 2 flowing out over redetermined fill level 7. Immersion container 4 may preferably be arranged above overflow container 3 in the direction of gravitational force. In particular, differential dosing scale 1 may include an overflow pump 16, with the aid of which fluid 2 to be dosed may be sucked out of overflow container 16 and supplied to immersion container 4, overflow pump 16 having a higher delivery rate than dosing pump 6. This makes it possible to ensure that, at any point in time, at least the same amount of fluid 2 may be supplied to immersion container 4 as flows out via overflow element 15.

Alternatively or additionally, differential dosing scale 1 may include a control valve, which is arranged in a fluid connection between storage container 3 and immersion container 4, and which is controlled and/or regulated in such a way that it supplies a fluid quantity to immersion container 4 from storage container 3, which corresponds to a fluid quantity discharged from differential dosing scale 1 via immersion tube 5.

FIG. 3 shows that differential dosing scale 1 includes a control and/or regulating device 17, which is designed to control and/or regulate dosing pump 6 depending on the weight of the system detected by weighing device 14 and depending on a control variable for a quantity of fluid 2 to be discharged from differential dosing scale 1 via immersion tube 5. A desired dosing quantity of fluid 2 may thus be supplied to the downstream process.

Figure 4:
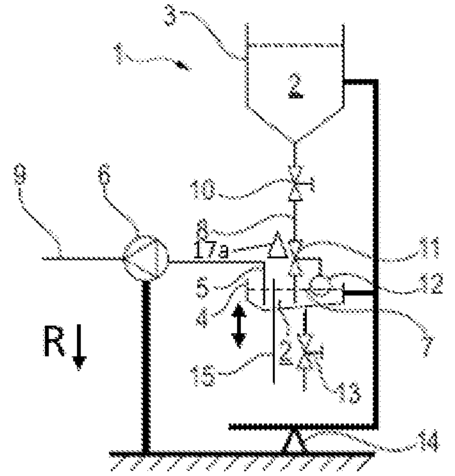
FIG. 4 shows a schematic representation of an example of a differential dosing scale according to the invention.

A differential dosing scale 1 in an example is illustrated in FIG. 4. The features which are identical to the features of the differential dosing scale described with reference to FIG. 1 are provided with the same reference numerals. Only the differences between differential dosing scale 1 and the differential dosing scale described with reference to FIG. 1 are therefore described below.

In the example illustrated in FIG. 4, the keeping constant of predetermined height 7 of the fluid level is implemented in that immersion container 4 is displaceable along a straight path of movement in parallel to direction of gravitational force R (which points downward in FIG. 4), which is indicated by a double arrow in FIG. 4. During the (net) discharge of fluid from immersion container 4 as a result of the dosing operation, immersion container 4 is then displaced antiparallel to direction of gravitational force R (i.e., upwardly in FIG. 4).

In this way, the fluid level dropping in immersion container 4 may be kept at a constant height relative to the immersion tube. In other words, the immersion depth of immersion tube 5 in immersion container 4 remains constant, since fluid level 7 dropping within immersion container 4 is compensated for by an equally distant, opposite upward displacement of immersion container 4.

Differential dosing scale 1 includes a detection device **17*a* for this purpose, with the aid of which the position of the fluid level in immersion container 4 is detected relative to a reference (for example, the intake opening of immersion tube 5). Detection device 17*a* is, for example, an ultrasonic sensor in the present case. It may detect the corresponding position of fluid level 7**, for example, by evaluating the two-way propagation time of an emitted ultrasonic signal up to the receipt of the echo.

Differential dosing scale 1 is thus designed to displace immersion container 4 depending on a fill level height of the fluid in immersion container 4.

In this example, fluid is temporarily transferred from storage container 2 into immersion container 4. For this purpose, float valve 11 is controlled by float body 12 in such a way that it opens the fluid connection between storage container 2 and immersion container 4 upon dropping below a lower fill level limit and disconnects the fluid connection upon reaching a second fill level limit.

While the fluid is being transferred from storage container 2 into immersion container 4, immersion container 4 is displaced in parallel to direction of gravitational force R (i.e., downwardly in FIG. 4), if a net increase of the fluid quantity in immersion container 4 occurs, i.e., if more fluid is added from storage container 2 than is removed from immersion container 4 via immersion tube 5. Otherwise, for example, only the displacement speed (antiparallel to direction of gravitational force R) could be adapted, in particular reduced. This achieves the fact that the immersion depth of immersion tube 5 remains constant even during the filling of immersion container 4.

Figure 5:
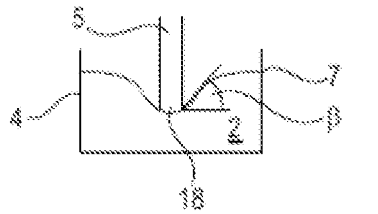
FIGS. 5 to 7 show different schematic representations of an immersion container and an immersion tube of the differential dosing scale for understanding the invention.
Figure 6:
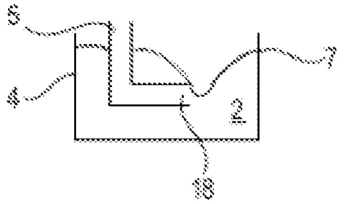
Figure 7:
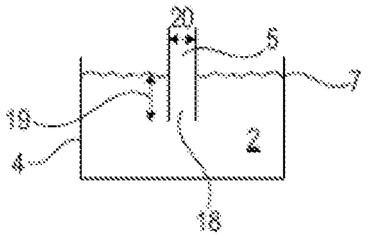

It is apparent in FIGS. 5 through 7, in an accentuated representation, that the fill level in immersion container 4 is also unable to change linearly, in particular in the case of a large removal quantity through immersion tube 5, and a slope angle β may be formed. To prevent the formation of a slope angle β of this type from influencing the buoyancy force of immersion tube 5, immersion tube 5 may be provided with an angled design, as illustrated in FIG. 6. As a result, an intake opening 18 of immersion tube 5 is arranged at a distance from an immersion section of immersion tube 5, so that the buoyancy force of immersion tube 5 does not change even if slope angle β forms, since the same part of immersion tube 5 remains covered by fluid. Due to the approach according to the invention (cf. FIG. 7), however, the fill level is kept constant at predetermined fill level 7, so that a straight design of immersion tube 5 is suitable. Immersion tube 5 should have an immersion depth 19, which is as shallow as possible, however at which the impact of turbulences on the surface of fluid 2 on the suction behavior at intake opening 18 is simultaneously prevented. It has thus been shown to be advantageous if immersion depth 19 of immersion tube 5 corresponds to 1 to 10 times an immersion tube diameter 20.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A differential dosing scale for dosing fluid, the differential dosing scale comprising:

an immersion container, in which the fluid to be dosed is contained and/or is received, and from which the fluid to be dosed is adapted to be discharged for a dosed removal of the fluid;

an immersion tube that dips into the immersion container for the dosed removal of the fluid to be dosed from the immersion container; and a dosing pump via which the fluid to be dosed is sucked out of the immersion container via the immersion tube and discharged from the differential dosing scale, wherein the differential dosing scale is designed structurally and/or in terms of control technology such that a fluid level of the fluid to be dosed, present in the immersion container, is controlled to be kept at a predetermined height relative to the immersion tube, the predetermined height remaining constant during the dosed removal of the fluid.

2. The differential dosing scale according to claim 1, wherein the fluid level of the fluid to be dosed, present in the immersion container, is kept at the predetermined height relative to an intake opening of the immersion tube.

3. The differential dosing scale according to claim 1, wherein the immersion container is displaceable along at least one path of movement running along a direction in parallel to a normal vector of the fluid level and/or to a direction of gravitational force.

4. The differential dosing scale according to claim 1, wherein the immersion tube is displaceable along at least one path of movement running along a direction in parallel to a normal vector of the fluid level and/or to a direction of gravitational force.

5. The differential dosing scale according to claim 4, wherein the dosing pump is displaceable along at least one path of movement running along a direction in parallel to the normal vector of the fluid level and/or to the direction of gravitational force, and the differential dosing scale is designed in such a way that the dosing pump is displaced in a same direction and/or at a same time as the immersion tube, and/or is kept at the predetermined height relative to the immersion tube and/or the fluid level.

6. The differential dosing scale according to claim 1, further comprising a detection device for detecting a position of the fluid level and/or for detecting a fill level height of the fluid in the immersion container, the detection device including an optical sensor, an ultrasonic sensor, and/or a microwave sensor.

7. The differential dosing scale according to claim 6, wherein the differential dosing scale is designed to displace the immersion container, the immersion tube, and/or the dosing pump depending on a position of the fluid level and/or a fill level height of the fluid in the immersion container, the position and/or fill level height being ascertained by the detection device.

8. The differential dosing scale according to claim 7, wherein at least the immersion container belongs to a weighed system of the differential dosing scale.

9. The differential dosing scale according to claim 8, wherein the differential dosing scale is designed to carry out a speed and/or a direction of the displacement of the immersion container, the immersion tube, and/or the dosing pump, in each case depending on a change in the position of the fluid level and/or the fill level height of the fluid in the immersion container and/or depending on a change in results of weighings of the weighed system.

10. The differential dosing scale according to claim 1, wherein the differential dosing scale is designed so that the immersion container and/or the immersion tube is/are displaced to maintain the predetermined height of the fluid level relative to the immersion tube.

11. The differential dosing scale according to claim 10, wherein the differential dosing scale is designed so that the immersion container and the immersion tube are both displaced at least temporarily simultaneously and/or in opposite directions to maintain the predetermined height of the fluid level relative to the immersion tube.

12. The differential dosing scale according to claim 1, further comprising a storage container, in which the fluid to be dosed is contained and/or is received, the immersion container being fluidically connected to the storage container for supplying the fluid to be dosed to the immersion container from the storage container.

13. The differential dosing scale according to claim 12, wherein the storage container belongs to a weighed system of the differential dosing scale.

14. The differential dosing scale according to claim 13, wherein the differential dosing scale is designed structurally and/or in terms of control technology in such a way that a fluid level of the fluid to be dosed, present in the immersion container, is kept at a fill level during the operation of the differential dosing scale and/or during the dosing of the fluid.

15. The differential dosing scale according to claim 14, wherein the differential dosing scale includes a float valve arranged in a fluid connection between the storage container and the immersion container and a float body arranged in the immersion container, the float valve being controlled by the float body such that the float valve opens the fluid connection upon dropping below the predetermined fill level and disconnects the fluid connection upon reaching the predetermined fill level.

16. The differential dosing scale according to claim 15, wherein the immersion container is arranged below the storage container in a direction of gravitational force, so that the fluid to be dosed may be supplied to the immersion container from the storage container due to the gravitational force.

17. The differential dosing scale according to claim 16, wherein the fluid connection determined via the float valve in the immersion container has a gravitational force-induced delivery rate, which is higher than a delivery rate of the dosing pump.

18. The differential dosing scale according to claim 12, wherein the differential dosing scale includes a control valve arranged in a fluid connection between the storage container and the immersion container, which is controlled and/or regulated in such a way that the control valve supplies a fluid quantity to the immersion container from the storage container, which corresponds to a fluid quantity discharged from the differential dosing scale via the immersion tube.

19. The differential dosing scale according to claim 12, wherein the differential dosing scale includes a weighing device, which is designed to detect a weight of a weighed system that includes the storage container, the immersion container, and the fluid to be dosed, contained therein, the differential dosing scale including a control and/or regulating device, which is designed to control and/or regulate the dosing pump depending on the weight of the system detected by the weighing device and depending on a control variable for a quantity of the fluid to be discharged from the differential dosing scale via the immersion tube.

20. The differential dosing scale according to claim 1, wherein the immersion tube has an intake opening for sucking the fluid to be dosed out of the immersion container, which is arranged such that the intake opening dips into the fluid at an immersion depth below a predetermined fill level, which is between 1 and 10 times an immersion tube diameter.

21. A differential dosing scale for dosing fluid, the differential dosing scale comprising:

an immersion container, in which the fluid to be dosed is contained and/or is received, and from which the fluid to be dosed is adapted to be discharged for a dosed removal of the fluid;

an immersion tube that dips into the immersion container for the dosed removal of the fluid to be dosed from the immersion container; and a dosing pump via which the fluid to be dosed is sucked out of the immersion container via the immersion tube and discharged from the differential dosing scale, wherein the differential dosing scale is designed structurally and/or in terms of control technology such that a fluid level of the fluid to be dosed, present in the immersion container, is kept at a constant predetermined height relative to the immersion tube, and wherein a volume receivable by the immersion container is adapted in that a base region and/or a wall region of the immersion container is movable and/or variable in shape, at least in regions.

22. The differential dosing scale according to claim 21, wherein the differential dosing scale is designed to adapt the volume receivable by the immersion container depending on a position of the fluid level and/or a fill level height of the fluid in the immersion container.

23. A differential dosing scale for dosing fluid, the differential dosing scale comprising;

an immersion container, in which the fluid to be dosed is contained and/or is received, and from which the fluid to be dosed is adapted to be discharged for a dosed removal of the fluid;

an immersion tube that dips into the immersion container for the dosed removal of the fluid to be dosed from the immersion container; and a dosing pump via which the fluid to be dosed is sucked out of the immersion container via the immersion tube and discharged from the differential dosing scale, wherein the differential dosing scale is designed structurally and/or in terms of control technology such that a fluid level of the fluid to be dosed, present in the immersion container, is kept at a constant predetermined height relative to the immersion tube, and wherein the differential dosing scale includes an overflow element fluidically connected to the immersion container, which is designed such that the fluid to be dosed flows out of the immersion container via the overflow element upon exceeding a predetermined fill level.

24. The differential dosing scale according to claim 23, wherein the differential dosing scale includes an overflow container, to which the overflow element is fluidically connected for collecting the fluid flowing out over the predetermined fill level, the immersion container being arranged above the overflow container in a direction of gravitational force.

25. The differential dosing scale according to claim 24, wherein the differential dosing scale includes an overflow pump, with the aid of which the fluid to be dosed is sucked out of the overflow container and supplied to the immersion container, the overflow pump having a higher delivery rate than the dosing pump.

26. A method for dosing fluid, wherein the fluid to be dosed is provided in an immersion container of a differential dosing scale, the method comprising:

sucking the fluid to be dosed from the immersion container, for a dosed removal of the fluid from the immersion container, with the aid of a dosing pump and via an immersion tube that dips into the immersion container; and keeping a fluid level of the fluid to be dosed in the immersion container at a, predetermined height relative to the immersion tube or to an intake opening of the immersion tube, the predetermined height remaining constant during an operation of the differential dosing scale and during the dosed removal of the fluid.

* * * * *